(12) United States Patent
Li et al.

(10) Patent No.: US 11,229,877 B2
(45) Date of Patent: Jan. 25, 2022

(54) GAS SCREENING FILM AND MANUFACTURING METHOD THEREOF AND FACE MASK

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Guangyao Li, Beijing (CN); Guangcai Yuan, Beijing (CN); Dongfang Wang, Beijing (CN); Jun Wang, Beijing (CN); Qinghe Wang, Beijing (CN); Wei Li, Beijing (CN); Leilei Cheng, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 254 days.

(21) Appl. No.: 16/611,417

(22) PCT Filed: Jan. 22, 2019

(86) PCT No.: PCT/CN2019/072691
§ 371 (c)(1),
(2) Date: Nov. 6, 2019

(87) PCT Pub. No.: WO2019/184568
PCT Pub. Date: Oct. 3, 2019

(65) Prior Publication Data
US 2020/0171426 A1    Jun. 4, 2020

(30) Foreign Application Priority Data
Mar. 26, 2018 (CN) .......................... 201810253024.6

(51) Int. Cl.
*B01D 53/22* (2006.01)
*B01D 69/12* (2006.01)
(Continued)

(52) U.S. Cl.
CPC ........... *B01D 53/228* (2013.01); *B01D 69/12* (2013.01); *B01D 67/0039* (2013.01);
(Continued)

(58) Field of Classification Search
CPC .. B01D 69/02; B01D 67/0039; B01D 53/228; B01D 69/12; B01D 2325/04; B01D 2323/30
See application file for complete search history.

(56) References Cited

U.S. PATENT DOCUMENTS 5,239,196 A * 8/1993 Ikeda ...................... H01L 27/11
257/385
5,738,731 A * 4/1998 Shindo .................. C23C 16/486
136/249
(Continued)

FOREIGN PATENT DOCUMENTS

CN    102265138 A    11/2011
CN    102974229 A    3/2013
(Continued)

OTHER PUBLICATIONS

First Office Action dated Mar. 18, 2020, for corresponding Chinese application 201810253024.6.

*Primary Examiner* — Anthony R Shumate
(74) *Attorney, Agent, or Firm* — Nath, Goldberg & Meyer; Joshua B. Goldberg

(57) ABSTRACT

The present disclosure provides a gas screening film including at least one gas screening element, each of the at least one gas screening element includes a transistor including a gate, an insulation spacing layer, a first electrode, a semi-
(Continued)

conductor nanosheet separation layer and a second electrode, and the insulation spacing layer is disposed between the gate and the semiconductor nanosheet separation layer. The present disclosure further provides a manufacturing method of the gas screening film and a face mask. The gas screening film can screen and separate various different gases as necessary.

20 Claims, 3 Drawing Sheets

(51) Int. Cl.
*B01D 67/00* (2006.01)
*B01D 69/02* (2006.01)
(52) U.S. Cl.
CPC .......... *B01D 69/02* (2013.01); *B01D 2323/30* (2013.01); *B01D 2325/04* (2013.01)

(56) References Cited

U.S. PATENT DOCUMENTS

| | | | |
|---|---|---|---|
| 6,077,731 A * | 6/2000 | Yamazaki | H01L 29/78621 438/150 |
| 6,191,007 B1 * | 2/2001 | Matsui | H01L 21/76264 438/459 |
| 6,240,010 B1 * | 5/2001 | Mukai | G11C 11/404 365/175 |
| 6,677,214 B1 * | 1/2004 | Shindo | H01L 31/1804 438/365 |
| 7,476,898 B2 * | 1/2009 | Oishi | H01L 29/66765 257/59 |
| 8,624,189 B2 | 1/2014 | Inada et al. | |
| 9,266,067 B2 | 2/2016 | Kong et al. | |
| 2001/0010370 A1 * | 8/2001 | Kimura | G02F 1/134363 257/59 |
| 2002/0154556 A1 * | 10/2002 | Endoh | H01L 29/7883 365/200 |
| 2011/0121366 A1 * | 5/2011 | Or-Bach | H01L 21/8221 257/204 |
| 2012/0129301 A1 * | 5/2012 | Or-Bach | H01L 27/10897 438/129 |
| 2014/0239367 A1 * | 8/2014 | Saito | H01L 29/792 257/319 |
| 2018/0164244 A1 | 6/2018 | Oka | |
| 2020/0033290 A1 * | 1/2020 | Wang | H01L 51/0096 |

FOREIGN PATENT DOCUMENTS

| | | |
|---|---|---|
| CN | 103127838 A | 6/2013 |
| CN | 104807868 A | 7/2015 |
| CN | 105866215 A | 8/2016 |
| CN | 107091874 A | 8/2017 |
| DE | 102006031849 A1 | 1/2008 |
| WO | 2016185679 A1 | 11/2016 |

* cited by examiner

GAS SCREENING FILM AND MANUFACTURING METHOD THEREOF AND FACE MASK

CROSS-REFERENCE TO RELATED APPLICATIONS

This is a National Phase Application filed under 35 U.S.C. 371 as a national stage of PCT/CN2019/072691, filed Jan. 22, 2019, claims the priority of Chinese Patent Application No. 201810253024.6, titled "GAS SCREENING FILM AND MANUFACTURING METHOD THEREOF AND FACE MASK", filed on Mar. 26, 2018, the content which are incorporated herein in their entirety by reference.

TECHNICAL FIELD

The present disclosure relates to a gas screening film, and in particular, relates to a gas screening film, a manufacturing method of the gas screening film and a face mask including the gas screening film.

BACKGROUND

In general, gas screening methods are classified into two major categories: chemical methods and physical methods. The physical method uses a gas screening film to separate and screen gases of different molecular masses. However, the current commonly used gas screening film can only separate gases whose molecular masses differ significantly from each other (for example, hydrogen and carbon dioxide), and cannot screen and separate gases with similar molecular masses, thereby limiting an application scope of the gas screening film.

SUMMARY

The present disclosure provides a gas screening film, a manufacturing method of the gas screening film and a face mask including the gas screening film.

In an embodiment of the present disclosure, there is provided a gas screening film including at least one gas screening element, each of the at least one gas screening element includes a transistor, which includes a gate, an insulation spacing layer, a first electrode, a semiconductor nanosheet separation layer and a second electrode, and the insulation spacing layer is disposed between the gate and the semiconductor nanosheet separation layer, and the semiconductor nanosheet separation layer is configured to perform gas screening and/or gas detection by changing a concentration of carriers in the semiconductor nanosheet separation layer.

Optionally, each of the at least one gas screening element includes a vertical-type thin film transistor, and in the gas screening element, the gate, the insulation spacing layer, the first electrode, the semiconductor nanosheet separation layer and the second electrode are sequentially arranged in a stack direction.

Optionally, the gas screening film includes a plurality of the gas screening elements arranged along a direction parallel to the stack direction and spaced apart from each other.

Optionally, each of the at least one gas screening element includes a lateral thin film transistor, and in the gas screening element, the gate, the insulation spacing layer, and the semiconductor nanosheet separation layer are sequentially arranged in a stack direction, the first electrode and the second electrode are disposed in a same layer and spaced apart from each other, and at least a part of the first electrode is disposed on the semiconductor nanosheet separation layer, and at least a part of the second electrode is disposed on the semiconductor nanosheet separation layer.

Optionally, the gas screening film includes a plurality of gas screening elements arranged along a direction perpendicular to the stack direction and spaced apart from each other, the semiconductor nanosheet separation layers of the plurality of gas screening elements are connected into one piece, the gates of the plurality of gas screening elements are connected into one piece, and the insulation spacing layers of every two adjacent gas screening elements are not connected to each other.

Optionally, the semiconductor nanosheet separation layer is a nano-film made of a metal organic framework material or the semiconductor nanosheet separation layer is made of layered transition metal sulfide.

Optionally, the nano-film made of the metal organic framework material is prepared from $Zn_2(Bim)_3$, and the layered transition metal sulfide is prepared from $MoS_2$.

Optionally, at least one of the gate, the first electrode and the second electrode is made of a monolayer graphene material, or at least one of the gate, the first electrode and the second electrode is made of a silver nanowire mesh, the silver nanowire mesh including a plurality of crisscrossing silver nanowires.

Optionally, the insulation spacing layer is made of aluminum trioxide.

Optionally, the gas screening film further includes a gate lead wire electrically coupled to the gate, a first electrode lead wire electrically coupled to the first electrode, and a second electrode lead wire electrically coupled to the second electrode.

In an embodiment of the present disclosure, there is provided a manufacturing method of a gas screening film, and the gas screening film includes at least one gas screening element, the manufacturing method includes: forming the at least one gas screening element such that each of the at least one the gas screening element includes a transistor, which includes a gate, an insulation spacing layer, a first electrode, a semiconductor nanosheet separation layer and a second electrode, the insulation spacing layer is disposed between the gate and the semiconductor nanosheet separation layer, and the semiconductor nanosheet separation layer is configured to perform gas screening and/or gas detection by changing a concentration of carriers in the semiconductor nanosheet separation layer.

Optionally, the gas screening film includes a plurality of gas screening elements arranged along a direction parallel to a stack direction and spaced apart from each other, layers of the gas screening element are arranged along the stack direction, and the step of forming the at least one gas screening element includes providing a base substrate; forming a gate layer on the base substrate; forming an insulation layer; forming a first electrode layer; forming a semiconductor nanosheet separation material layer; forming a second electrode layer; peeling off the base substrate to obtain an element layer; dividing the element layer into a plurality of the gas screening elements, wherein the gate layer is divided into a plurality of gates, the insulation layer is divided into a plurality of insulation spacing layers, the first electrode layer is divided into a plurality of first electrodes, the semiconductor nanosheet separation material layer is divided into a plurality of semiconductor nanosheet separation layers, and the second electrode layer is divided into a plurality of second electrodes.

Optionally, the step of forming the at least one gas screening element includes: providing a base substrate; forming a pattern including a gate layer on the base substrate such that the gate layer includes at least one gate; forming a pattern including an insulation layer on the gate layer, wherein the pattern including the insulation layer includes a pattern of at least one insulation spacing layer corresponding to at least one gas screening element respectively, wherein insulation spacing layers of every two adjacent gas screening elements are spaced apart from each other by a spacer therebetween; forming a pattern including a semiconductor nanosheet separation layer, wherein the pattern including the semiconductor nanosheet separation layer includes a semiconductor nanosheet separation layer which is integrally formed and covers the at least one insulation spacing layer and the spacer; forming a pattern including an electrode layer on the pattern including the semiconductor nanosheet separation layer, wherein the pattern including the electrode layer includes at least one pair of first and second electrodes corresponding to the at least one gas screening element respectively, to obtain a plurality of gas screening elements, and in the gas screening element, the first electrode and the second electrode are spaced apart from each other, a part of the first electrode is disposed on the semiconductor nanosheet separation layer, and a part of the second electrode is disposed on the semiconductor nanosheet separation layer; and the manufacturing method further includes peeling off the base substrate.

Optionally, at least one of the gate, the first electrode and the second electrode is made of a monolayer graphene material, or at least one of the gate, the first electrode and the second electrode is made of a silver nanowire mesh, the silver nanowire mesh including a plurality of crisscrossing silver nanowires.

Optionally, the semiconductor nanosheet separation layer is a nano-film made of a metal organic framework material or the semiconductor nanosheet separation layer is made of layered transition metal sulfide, and the step of forming the pattern including the semiconductor nanosheet separation layer is performed by screen printing.

Optionally, the manufacturing method further includes forming a pattern including a gate lead wire such that the gate lead wire is electrically coupled to the gate layer; forming a pattern including a first electrode lead wire such that the first electrode lead wire is electrically coupled to the first electrode layer; and forming a pattern including a second electrode lead wire such that the second electrode lead wire is electrically coupled to the second electrode layer.

Optionally, the insulation spacing layer is made of aluminum trioxide.

In an embodiment of the present disclosure, there is provided a face mask including a gas filtering part, and the gas filtering part including the gas screening film as above.

BRIEF DESCRIPTION OF THE DRAWINGS

The accompanying drawings, which constitute a part of the specification, are provided for further understanding of the present disclosure and for explaining the present disclosure along with the following specific implementations, but not intended to limit the present disclosure, in which.

DETAILED DESCRIPTION

Specific embodiments of the present disclosure will be described in detail below in conjunction with the accompanying drawings. It should be understood that, the specific embodiments described herein are solely for the purpose of explaining and interpreting the present disclosure rather than limiting the present disclosure.

Figure 1:
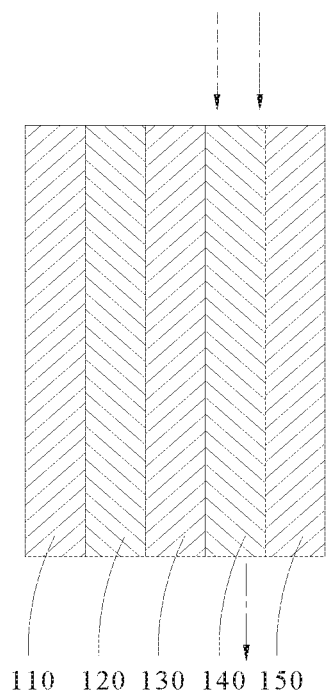
FIG. 1 is a schematic diagram of a structure of a gas screening film according to an embodiment of the present disclosure.
Figure 2:
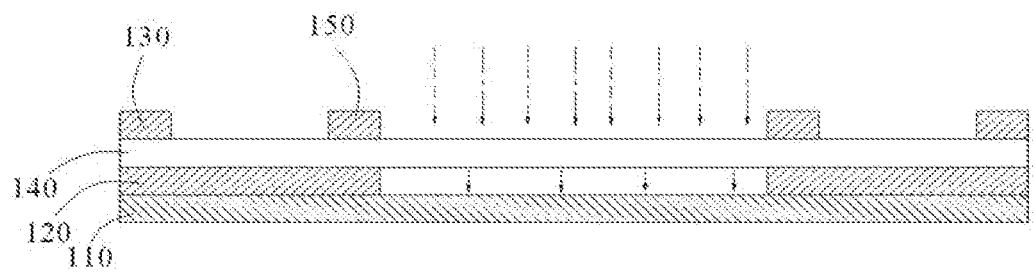
FIG. 2 is a cross-sectional view of a gas screening film according to an embodiment of the present disclosure.
Figure 3:
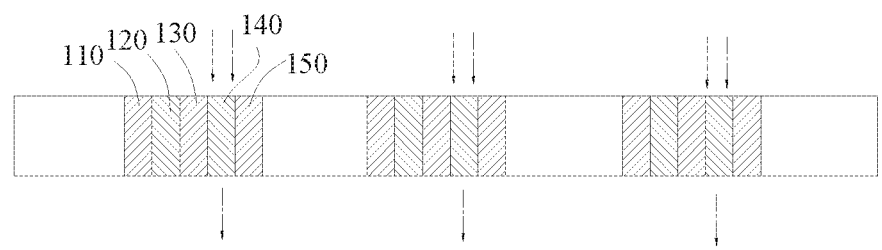
FIG. 3 is a schematic diagram of a structure of a gas screening film according to an embodiment of the present disclosure.

In the present disclosure, as shown in FIGS. 1 to 3, there is provided a gas screening film. As shown in FIG. 2, the gas screening film includes at least one gas screening element. As shown in FIGS. 1 and 2, the gas screening element is formed as a transistor including a gate 110, an insulation spacing layer 120, a first electrode 130, a semiconductor nanosheet separation layer 140 and a second electrode 150, and the insulation spacing layer 120 is disposed between the gate 110 and the semiconductor nanosheet separation layer 140.

The semiconductor nanosheet separation layer 140 is made of a two-dimensional material, having pores through which gas molecules can pass. Activities of some gases are susceptible to concentration of carriers in the semiconductor nanosheet separation layer 140. By supplying a turn-on voltage to the gate 110 of the gas screening element, a first reference voltage to the first electrode 130, and a second reference voltage to the second electrode 150, the carriers in the semiconductor nanosheet separation layer 140 can be excited to move. By setting a voltage difference between the first electrode 130 and the second electrode 150, and the voltage of the gate 110, the concentration of the carriers in the semiconductor nanosheet separation layer 140 may be changed.

As described above, some gases have activities susceptible to the concentration of the carriers in the semiconductor nanosheet separation layer. By setting the turn-on voltage, the first reference voltage and the second reference voltage, activity of one gas with respect to the semiconductor nanosheet separation layer may be increased while activity of another gas with respect to the semiconductor nanosheet separation layer may be decreased. Thereby, the gas screening film according to the present disclosure can be used to screen gases having similar molecular masses (for example, to screen and separate $C_2H_4$ and $N_2$), and the gas screening film according to the present disclosure can also be used to screen gasses having large difference in molecular mass (for example, to screen and separate $H_2$ and $CO_2$), so that the gas screening film has a broader application scope.

In the present disclosure, the gas screening film may be used in fields of high precision detector, wearable apparatus, etc. Since the gas screening element is configured as a transistor, and the transistor is an element having a low power supply voltage, when screening and separating gases, the gas screening film has low energy consumption.

In the present disclosure, there are various gas screening elements, each of which may be used for the gas screening film.

In an embodiment of the present disclosure, the gas screening element may be configured as a vertical-type thin film transistor. Specifically, in a gas screening element, as shown in FIG. 1, the gate 110, the insulation spacing layer 120, the first electrode 130, the semiconductor nanosheet separation layer 140 and the second electrode 150 are sequentially arranged in a stack direction.

Since the gas screening element is a vertical-type thin film transistor, when the gate 110, the first electrode 130 and the second electrode 150 are supplied with respective voltage signals, the concentration of the carriers in the semiconductor nanosheet separation layer 140 in a direction perpendicular to the stack direction (that is, vertical direction in FIG. 1) is changed. When two gases are supplied towards one side of the gas screening element, only the gas whose relative activity in the semiconductor nanosheet separation layer 140 is higher can pass through the gas screening element. Specifically, as shown in FIG. 1, the dash line arrow denotes one gas, and the dot dash line arrow another gas. Supplying appropriate voltages to the gate 110, the first electrode 130 and the second electrode 150 may increase activity of the gas denoted by the dot dash line arrow with respect to the semiconductor nanosheet separation layer 140, so as to allow the gas denoted by the dot dash line arrow to pass through, while not allowing the gas denoted by the dash line arrow to pass through.

In the present disclosure, how to arrange the gas screening element as shown in FIG. 1 into the gas screening film is not limited. For example, as shown in FIG. 3, the gas screening film may include a film body which is provided with a plurality of installation through holes, each of which is provided with at least one gas screening element. In this embodiment, the gas screening film includes a plurality of gas screening elements arranged in such a manner that they are spaced apart in a direction parallel to the stack direction.

The film body is made of a material that is not ventilating, such as an inorganic insulation layer, a resin material layer or the like, which can guarantee accuracy of gas screening result, as well as function as a protection layer.

In an embodiment of the present disclosure, a gas screening element may be a lateral thin film transistor. As shown in FIG. 2, in the gas screening element, the gate 110, the insulation spacing layer 120, and the semiconductor nanosheet separation layer 140 are sequentially arranged in a stack direction. The first electrode 130 and the second electrode 150 are disposed in a same layer, and spaced apart from each other. At least a part of the first electrode 130 is disposed on the semiconductor nanosheet separation layer 140, and at least a part of the second electrode 150 is disposed on the semiconductor nanosheet separation layer 140, In this structure, the gates 110 for the gas screening elements may be integrally formed, and the semiconductor nanosheet separation layers 140 for the gas screening elements may be also integrally formed. The structure as the gas screening element is in fact embodied by the part between two lateral transistors formed at both ends, respectively, and voltages are applied to the second electrode 150 of the transistor at one of the ends (at the left-hand side in FIG. 2) and the first electrode 130 of the transistor at the other end (at the right-hand side in FIG. 2), to change the concentration of the carriers in the semiconductor nanosheet separation layer in this part. The semiconductor nanosheet separation layer in this part of the structure has no other layer structure formed at both upper and lower sides, and the insulation spacing layers 120 of the two lateral transistors at both ends are not connected in this part. An insulation layer in this part for the gas screening element may be a gas gate insulation layer in this middle part, to change the concentration of the carriers in the semiconductor nanosheet separation layer in the middle part. When mixed gases pass through the gas screening film, through-passing and ventilation are performed at surfaces front and back of the gas gate insulation layer.

In the embodiment shown in FIG. 2, when the gate 110 is supplied with the turn-on voltage, the first electrode 130 is supplied with the first reference voltage, and the second electrode 150 is supplied with the second reference voltage, the concentration of the carriers in the semiconductor nanosheet separation layer 140 in a direction parallel to the stack direction (that is, the vertical direction in FIG. 2) is changed. When various gases are supplied towards one side of the semiconductor nanosheet separation layer 140, those having higher activities with respect to the semiconductor nanosheet separation layer 140 pass through the semiconductor nanosheet separation layer 140.

In the present disclosure, insulation spacing layers of different gas screening elements may be small pieces independent of each other.

Undoubtedly, the present disclosure is not limited thereto. To facilitate film formation, insulation spacing layers of different gas screening elements may be connected as one piece, and a plurality of ventilation holes may be formed in the insulation spacing layers, so as to facilitate gas screening.

When the gas screening element is a lateral thin film transistor, as shown in FIG. 2, a plurality of gas screening elements are arranged to be spaced apart in a direction perpendicular to the stack direction, and the semiconductor nanosheet separation layers of the plurality of gas screening elements are connected as one piece.

Herein, "the plurality of gas screening elements are arranged to be spaced apart", means that electrodes (including gates, first electrodes and second electrodes) of the plurality of gas screening elements are arranged to be spaced apart.

It is to be noted that, spacing between the gas screening elements in the gas screening film may be adjusted according to practical process conditions, and if the process conditions permit, the gas screening elements may be arranged as close to each other as possible, so as to ensure that change in the concentration of the carriers in the semiconductor nanosheet separation layers in different areas is consistent, to achieve fine gas screening.

As shown in FIG. 2, the dash line arrow denotes one gas, and the dot dash line arrow another gas. Supplying appropriate voltages to the gate 110, the first electrode 130 and the second electrode 150 may increase activity of the gas denoted by the dot dash line arrow with respect to the semiconductor nanosheet separation layer, so as to allow the gas denoted by the dot dash line arrow to pass through, while not allowing the gas denoted by the dash line arrow to pass through.

In the present disclosure, the materials, which the gate, the first electrode, and the second electrode are made of, are not limited. For example, the first electrode, the second electrode and the gate each may be made of a metal material. In order to avoid the affect on the semiconductor nanosheet separation layer when forming the gate, the first electrode, and the second electrode, optionally, at least one of the gate 110, the first electrode 130 and the second electrode 150 may be made of a monolayer graphene material. Alternatively, at least one of the gate 110, the first electrode 130 and the second electrode 150 may be made of a metal mesh (for example, a silver nanowire mesh, the silver nanowire mesh including a plurality of crisscrossing silver nanowires). Regardless of what material each electrode of the gas screening film is made of, the gas screening film has a small thickness. Thus, the gas screening film according to the present disclosure is ultrathin, satisfying the current demand for thinning of electronic devices.

In the present disclosure, the material, which the semiconductor nanosheet separation layer is made of, is not limited. In an embodiment, the semiconductor nanosheet separation layer is a nano-film made of a metal organic framework material (for example, a nano-film made of a $Zn_2(Bim)_3$ material). The nano-film made of the metal organic framework material itself has a rich skeleton structure with high-density hole channels of size in a molecular scale. In a case of no electric supply, the nano-film made of the metal organic framework material itself is a good high-flux gas separating film. Specifically, gases of relatively large difference in molecular masses can be screened and separated by using the nano-film made of the metal organic framework material. In a case of applying electricity, the concentration of the carriers within the nano-film made of the metal organic framework material may change.

The material of the semiconductor nanosheet separation layer in the present application is not limited thereto. For example, other material based on the metal organic framework material and having semiconductor characteristics may also be suitable to the present application, as long as molecule screening characteristics of the material change as the concentration of the carriers in the material.

In the present disclosure, a thickness of the semiconductor nanosheet separation layer of the nano-film made of the metal organic framework material is mot limited. For example, the thickness of the semiconductor nanosheet separation layer 140 may be between 1 nm to 10 nm.

Undoubtedly, the present disclosure is not limited thereto. For example, the material of the semiconductor nanosheet separation layer 140 may also be layered transition metal sulfide (e.g. $MoS_2$).

In the present disclosure, a material of the insulation spacing layer 120 is not limited. In an embodiment, the material of the insulation spacing layer 120 may include aluminum trioxide.

To facilitate power supply to the gas screening film, and operation driving of the gas screening film, optionally, the gas screening film may include a gate lead wire electrically coupled to the gate, a first electrode lead wire electrically coupled to the first electrode, and a second electrode lead wire electrically coupled to the second electrode.

As a second aspect of the present disclosure, there is provided a manufacturing method of a gas screening film, and the manufacturing method includes the following steps.

A gas screening element is formed, the gas screening element is formed as a transistor including a gate, an insulation spacing layer, a first electrode, a semiconductor nanosheet separation layer and a second electrode, and the insulation spacing layer is disposed between the gate and the semiconductor nanosheet separation layer. The semiconductor nanosheet separation layer is configured to perform gas screening and/or gas detection by changing a concentration of carriers in the semiconductor nanosheet separation layer.

As described above, the gas screening element may be a vertical-type thin film transistor, or may be a lateral thin film transistor. Different manufacturing processes apply to different types of the gas screening elements.

Figure 4:
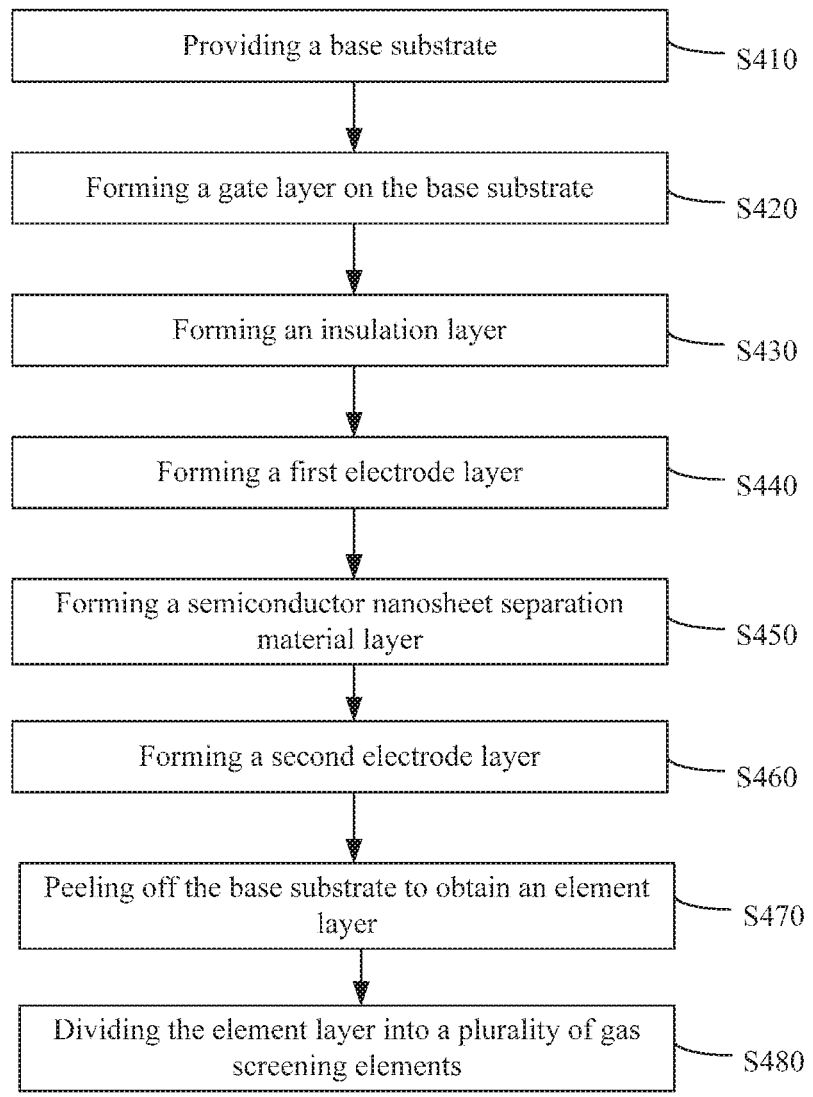
FIG. 4 is a flow chart illustrating a method of manufacturing a gas screening element in a gas screening film according to an embodiment of the present disclosure.

Specifically, if the gas screening element is a vertical-type thin film transistor, as shown in FIG. 4, the step of forming the gas screening element may include the following steps:

Step S410, providing a base substrate;
Step S420, forming a gate layer on the base substrate;
Step S430, forming an insulation layer;
Step S440, forming a first electrode layer;
Step S450, forming a semiconductor nanosheet separation material layer;
Step S460, forming a second electrode layer;
Step S470, peeling off the base substrate, to obtain an element layer;
Step S480, dividing the element layer into a plurality of gas screening elements such that the gate layer is divided into a plurality of gates, the insulation layer is divided into a plurality of insulation spacing layers, the first electrode layer is divided into a plurality of first electrodes, the semiconductor nanosheet separation material layer is divided into a plurality of semiconductor nanosheet separation layers, and the second electrode layer is divided into a plurality of second electrodes.

That is, in the above step S480, the element layer may be divided into a plurality of gas screening elements, each of which as shown in FIG. 1, for example.

In the embodiment, the manufacturing method further includes providing a film body provided with a plurality of installation through holes; and arranging each of the gas screening elements formed by the above-described method in one of the installation through holes to form the gas screening film including a plurality of gas screening elements, as shown in FIG. 3.

Figure 5:
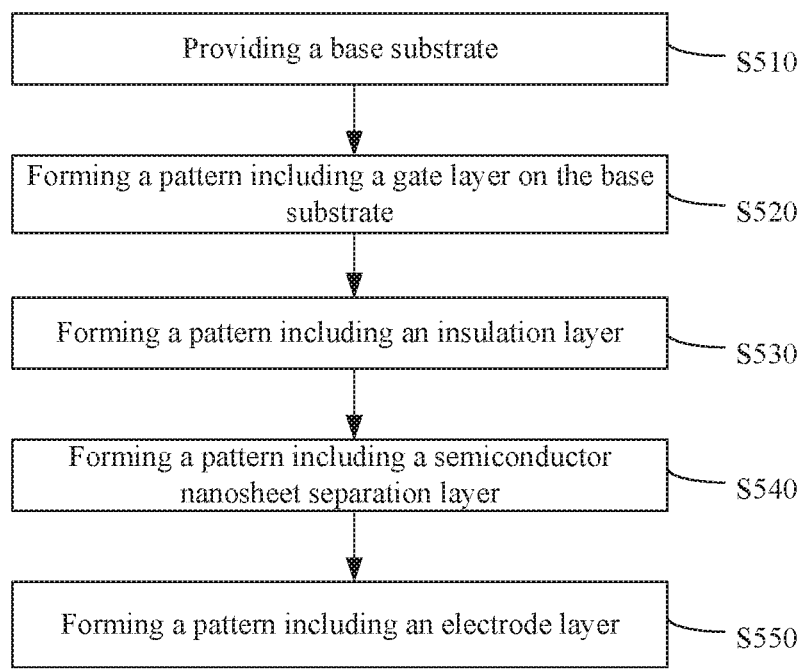
FIG. 5 is a flow chart illustrating a method of manufacturing a gas screening element in a gas screening film according to an embodiment of the present disclosure.

If the gas screening element is a lateral thin film transistor, as shown in FIG. 2, then as shown in FIG. 5, the step of forming the gas screening element includes:

Step S510, providing a base substrate;
Step S520, forming a pattern including a gate layer on the base substrate such that the gate layer includes at least one gate;
Step S530, forming a pattern of an insulation layer on the gate layer such that the pattern of the insulation layer includes a pattern of at least one respective insulation spacing layers corresponding to at least one gas screening element, and every two adjacent gas screening elements include insulation spacing layers that are spaced apart by a spacer therebetween;
Step S540, forming a pattern including a semiconductor nanosheet separation layer such that the pattern of the semiconductor nanosheet separation layer includes a semiconductor nanosheet separation layer which is integrally formed and covers the at least one insulation spacing layers and the spacer therebetween;
Step S550, forming a pattern including an electrode layer on the pattern of the semiconductor nanosheet separation layer such that the pattern of the electrode layer includes at least one respective pair of first and second electrodes corresponding to the at least one gas screening elements, to obtain a plurality of gas screening elements, and in a gas screening element, the first electrode and the second electrode are spaced apart from each other, a part of the first electrode is disposed on the semiconductor nanosheet separation layer, and a part of the second electrode is disposed on the semiconductor nanosheet separation layer;

Accordingly, the manufacturing method further includes peeling off the base substrate to obtain the gas screening film.

In the manufacturing method according to the present disclosure, the gas screening film is manufactured on a base substrate, which can improve yield rate of the product.

As described above, at least one of the gate, the first electrode and the second electrode may be made of a monolayer graphene material. Alternatively, at least one of the gate, the first electrode and the second electrode may be made of a silver nanowire mesh, the silver nanowire mesh including a plurality of crisscrossing silver nanowires.

If the at least one of the gate, the first electrode and the second electrode is made of the monolayer graphene material, a pattern of the at least one of the gate, the first electrode and the second electrode may be formed by using a solution to transfer monolayer graphene.

If the at least one of the gate, the first electrode and the second electrode is made of the silver nanowire mesh, a pattern of the at least one of the gate, the first electrode and the second electrode may be formed by screen printing.

As described above, the semiconductor nanosheet separation layer may be a nanodisphram made of a metal organic framework (MOF) material: $Zn_2(Bim)_3$ or layered transition metal sulfide. In the step of forming the pattern including the semiconductor nanosheet separation layer, the pattern including the semiconductor nanosheet separation layer may be formed by screen printing.

To facilitate manufacturing, optionally, the base substrate is a flexible base body layer.

Further optionally, a material of the flexible base body layer includes polydimethylsiloxane (PDMS).

To facilitate power supply, optionally, the manufacturing method further includes:

forming a pattern including a gate lead wire such that the gate lead wire is electrically coupled to the gate layer;

forming a pattern including a first electrode lead wire such that the first electrode lead wire is electrically coupled to the first electrode layer; and forming a pattern including a second electrode lead wire such that the second electrode lead wire is electrically coupled to the second electrode layer.

The gate lead wire, the first electrode lead wire and the second electrode lead wire may be formed in a same step, and then may be electrically coupled to the gate layer, the first electrode layer and the second electrode layer by via holes or the like, respectively.

The gate lead wire, the first electrode lead wire and the second electrode lead wire may be formed in different steps. For example, the gate lead wire may be formed simultaneously as the gate layer is formed, the first electrode lead wire may be formed simultaneously as the first electrode layer is formed, and the second electrode lead wire may be formed simultaneously as the second electrode layer is formed.

As described above, the material of the insulation spacing layer includes aluminum trioxide.

As a third aspect of the present disclosure, there is provided a face mask, including a gas filtering part, and the gas filtering part includes the above gas screening film according to the present disclosure.

As described above, activity of a gas with respect to the semiconductor nanosheet separation layer may be changed by changing the concentration of carriers in the semiconductor nanosheet separation layer of the gas screening film. By controlling voltages applied on the first electrode and the second electrode of the gas screening element of the gas screening film, only particular gas is permitted to pass through the gas screening element, thereby realizing a better protection function.

For example, the face mask may be a coal gas proof mask, and by setting voltages on the first electrode and the second electrode of the gas screening element, carbon monoxide may be prevented from passing through the gas screening film, thereby realizing better protection to the wearer.

It should be understood that, the above embodiments are only exemplary embodiments for the purpose of explaining the principle of the present disclosure, and the present disclosure is not limited thereto. For a person skilled in the art, various improvements and modifications may be made without departing from the spirit and essence of the present disclosure. These improvements and modifications also fall within the protection scope of the present disclosure.

What is claimed is:

1. A gas screening film, comprising at least one gas screening element, wherein
each of the at least one gas screening element comprises a transistor, which comprises a gate, an insulation spacing layer, a first electrode, a semiconductor nanosheet separation layer and a second electrode, and the insulation spacing layer is disposed between the gate and the semiconductor nanosheet separation layer, and
the semiconductor nanosheet separation layer is configured to perform gas screening and/or gas detection by changing a concentration of carriers in the semiconductor nanosheet separation layer.

2. The gas screening film according to claim 1, wherein each of the at least one gas screening element comprises a vertical-type thin film transistor, and in the gas screening element, the gate, the insulation spacing layer, the first electrode, the semiconductor nanosheet separation layer and the second electrode are sequentially arranged in a stack direction.

3. The gas screening film according to claim 2, wherein the gas screening film comprises a plurality of the gas screening elements arranged along a direction parallel to the stack direction and spaced apart from each other.

4. The gas screening film according to claim 1, wherein each of the at least one gas screening element comprises a lateral thin film transistor, and in the gas screening element, the gate, the insulation spacing layer, and the semiconductor nanosheet separation layer are sequentially arranged in a stack direction, the first electrode and the second electrode are disposed in a same layer and spaced apart from each other, and at least a part of the first electrode is disposed on the semiconductor nanosheet separation layer, and at least a part of the second electrode is disposed on the semiconductor nanosheet separation layer.

5. The gas screening film according to claim 4, wherein the gas screening film comprises a plurality of gas screening elements arranged along a direction perpendicular to the stack direction and spaced apart from each other, the semiconductor nanosheet separation layers of the plurality of gas screening elements are connected into one piece, the gates of the plurality of gas screening elements are connected into one piece, and the insulation spacing layers of every two adjacent gas screening elements are not connected to each other.

6. The gas screening film according to claim 1, wherein the semiconductor nanosheet separation layer is a nano-film made of a metal organic framework material or the semiconductor nanosheet separation layer is made of layered transition metal sulfide.

7. The gas screening film according to claim 6, wherein the nano-film made of the metal organic framework material is prepared from $Zn_2(Bim)_3$, and the layered transition metal sulfide is prepared from $MoS_2$.

8. The gas screening film according to claim 1, wherein at least one of the gate, the first electrode and the second electrode is made of a monolayer graphene material, or at least one of the gate, the first electrode and the second electrode is made of a silver nanowire mesh, the silver nanowire mesh comprising a plurality of crisscrossing silver nanowires.

9. The gas screening film according to claim 1, wherein the insulation spacing layer is made of aluminum trioxide.

10. The gas screening film according to claim 1, further comprising a gate lead wire electrically coupled to the gate, a first electrode lead wire electrically coupled to the first electrode, and a second electrode lead wire electrically coupled to the second electrode.

11. A manufacturing method of a gas screening film, wherein the gas screening film comprises at least one gas screening element, the manufacturing method comprises:

forming the at least one gas screening element such that each of the at least one the gas screening element comprises a transistor, which comprises a gate, an insulation spacing layer, a first electrode, a semiconductor nanosheet separation layer and a second electrode, the insulation spacing layer is disposed between the gate and the semiconductor nanosheet separation layer, and the semiconductor nanosheet separation layer is configured to perform gas screening and/or gas detection by changing a concentration of carriers in the semiconductor nanosheet separation layer.

12. The manufacturing method according to claim 11, wherein the gas screening film comprises a plurality of gas screening elements arranged along a direction parallel to a stack direction and spaced apart from each other, layers of the gas screening element are arranged along the stack direction, and the step of forming the at least one gas screening element comprises:

providing a base substrate;
forming a gate layer on the base substrate;
forming an insulation layer;
forming a first electrode layer;
forming a semiconductor nanosheet separation material layer;
forming a second electrode layer;
peeling off the base substrate to obtain an element layer;
dividing the element layer into a plurality of the gas screening elements, wherein the gate layer is divided into a plurality of gates, the insulation layer is divided into a plurality of insulation spacing layers, the first electrode layer is divided into a plurality of first electrodes, the semiconductor nanosheet separation material layer is divided into a plurality of semiconductor nanosheet separation layers, and the second electrode layer is divided into a plurality of second electrodes.

13. The manufacturing method according to claim 11, wherein the step of forming the at least one gas screening element comprises:

providing a base substrate;
forming a pattern comprising a gate layer on the base substrate, wherein the gate layer comprises at least one gate;
forming a pattern comprising an insulation layer on the gate layer, wherein the pattern comprising the insulation layer comprises a pattern of at least one insulation spacing layer corresponding to at least one gas screening element respectively, wherein insulation spacing layers of every two adjacent gas screening elements are spaced apart from each other by a spacer therebetween;

a pattern comprising the semiconductor nanosheet separation layer, wherein the pattern comprising the semiconductor nanosheet separation layer comprises the semiconductor nanosheet separation layer which is integrally formed and covers the at least one insulation spacing layer and the spacer;

forming a pattern comprising an electrode layer on the pattern comprising the semiconductor nanosheet separation layer, wherein the pattern comprising the electrode layer comprises at least one pair of first and second electrodes corresponding to the at least one gas screening element respectively, to obtain a plurality of gas screening elements, and in the gas screening element, the first electrode and the second electrode are spaced apart from each other, a part of the first electrode is disposed on the semiconductor nanosheet separation layer, and a part of the second electrode is disposed on the semiconductor nanosheet separation layer; wherein the manufacturing method further comprises:
peeling off the base substrate.

14. The manufacturing method according to claim 11, wherein at least one of the gate, the first electrode and the second electrode is made of a monolayer graphene material, or at least one of the gate, the first electrode and the second electrode is made of a silver nanowire mesh, the silver nanowire mesh comprising a plurality of crisscrossing silver nanowires.

15. The manufacturing method according to claim 11, wherein the semiconductor nanosheet separation layer is a nano-film made of a metal organic framework material or the semiconductor nanosheet separation layer is made of layered transition metal sulfide, and the step of forming the pattern comprising the semiconductor nanosheet separation layer is performed by screen printing.

16. The manufacturing method according to claim 11, further comprising:

forming a pattern comprising a gate lead wire such that the gate lead wire is electrically coupled to the gate layer;
forming a pattern comprising a first electrode lead wire such that the first electrode lead wire is electrically coupled to the first electrode layer; and
forming a pattern comprising a second electrode lead wire such that the second electrode lead wire is electrically coupled to the second electrode layer.

17. The manufacturing method according to claim 11, wherein the insulation spacing layer is made of aluminum trioxide.

18. A face mask, comprising a gas filtering part, wherein the gas filtering part comprises the gas screening film according to claim 1.

19. The gas screening film according to claim 2, wherein the semiconductor nanosheet separation layer is a nano-film made of a metal organic framework material or the semiconductor nanosheet separation layer is made of layered transition metal sulfide.

20. The gas screening film according to claim 3, wherein the semiconductor nanosheet separation layer is a nano-film made of a metal organic framework material or the semiconductor nanosheet separation layer is made of layered transition metal sulfide.

* * * * *